United States Patent
Mennekens

(10) Patent No.: US 11,146,106 B2
(45) Date of Patent: Oct. 12, 2021

(54) RADIO-FREQUENCY ENERGY HARVESTING CIRCUIT AND COMMUNICATION DEVICE INTEGRATING SUCH A RADIO-FREQUENCY ENERGY HARVESTING CIRCUIT

(71) Applicant: UWINLOC, Toulouse (FR)

(72) Inventor: Jan Mennekens, Péguilhan (FR)

(73) Assignee: UWINLOC, Toulouse (FR)

( * ) Notice: Subject to any disclaimer, the term of this patent is extended or adjusted under 35 U.S.C. 154(b) by 0 days.

(21) Appl. No.: 17/260,431

(22) PCT Filed: Aug. 7, 2019

(86) PCT No.: PCT/EP2019/071226
§ 371 (c)(1),
(2) Date: Jan. 14, 2021

(87) PCT Pub. No.: WO2020/030696
PCT Pub. Date: Feb. 13, 2020

(65) Prior Publication Data
US 2021/0249901 A1      Aug. 12, 2021

(30) Foreign Application Priority Data

Aug. 10, 2018   (FR) ...................................... 1857445

(51) Int. Cl.
*H02J 50/00* (2016.01)
*H02J 50/27* (2016.01)
(Continued)

(52) U.S. Cl.
CPC ............ *H02J 50/001* (2020.01); *H02J 50/27* (2016.02); *H04W 72/0473* (2013.01); *H04W 74/0816* (2013.01); *H02J 2207/50* (2020.01)

(58) Field of Classification Search
CPC ........... H02J 50/00; H02J 50/001; H02J 50/27
See application file for complete search history.

(56) References Cited

U.S. PATENT DOCUMENTS

| 2009/0067208 A1* | 3/2009 | Martin | H02J 7/025 363/126 |
| 2013/0170090 A1* | 7/2013 | Colannino | F23D 14/151 361/225 |

(Continued)

FOREIGN PATENT DOCUMENTS

| CN | 102790433 A | 11/2012 |
| CN | 105958670 A | 9/2016 |

(Continued)

OTHER PUBLICATIONS

Ibrahim, Sutrisno; Ali, Wahied; "Power Enhancement for Piezoelectric Energy Harvester"; Jul. 4-6, 2012, Proceedings of the World Congress on Engineering 2012 vol. II, pp. 1-6 (Year: 2012).*

(Continued)

*Primary Examiner* — Hal Kaplan
*Assistant Examiner* — Joseph N Inge
(74) *Attorney, Agent, or Firm* — Pillsbury Winthrop Shaw Pittman LLP

(57) ABSTRACT

A radio-frequency energy harvesting circuit includes an antenna suitable for receiving the radio-frequency energy, a converter suitable for converting the radio-frequency energy received into a direct current electrical voltage, the "RF/DC converter", an electrical energy storage capacity and an interface circuit arranged between an output port of the RF/DC converter and the electrical energy storage capacity. The interface circuit is a passive electrical circuit including a resistive load placed in series between the output port of the RF/DC converter and the electrical energy storage capacity, the resistive load being of static value equal to or greater than 400 kilo-ohms.

10 Claims, 2 Drawing Sheets

(51) Int. Cl.
H04W 72/04 (2009.01)
H04W 74/08 (2009.01)

(56) References Cited

U.S. PATENT DOCUMENTS

| 2015/0365013 A1* | 12/2015 | Hameed | H02M 7/25 |
|---|---|---|---|
| | | | 363/126 |
| 2016/0285314 A1* | 9/2016 | Van Neste | H02J 50/12 |
| 2018/0183256 A1* | 6/2018 | Tanaka | H02M 1/00 |
| 2020/0076199 A1* | 3/2020 | Kaufman | H03K 17/08116 |
| 2020/0091738 A1* | 3/2020 | Kim | H02N 2/181 |
| 2020/0112190 A1* | 4/2020 | Honke | H02J 7/0063 |
| 2020/0168996 A1* | 5/2020 | Nasimuddin | H01Q 5/50 |

FOREIGN PATENT DOCUMENTS

| CN | 106874984 A | 6/2017 |
|---|---|---|
| FR | 2 904 880 A1 | 2/2008 |

OTHER PUBLICATIONS

Arrawatia, Mahima; Baghini, Maryam; Kumar, Girish; "RF Energy Harvesting System At 2.67 and 5.8GHz"' 2010, Proceedings of Asia-Pacific Microwave Conference 2010, pp. 900-903 (Year: 2010).*

International Search Report as issued in International Patent Application No. PCT/EP2019/071226, dated Oct. 21, 2019.

Written Opinion of the International Searching Authority as issued in International Patent Application No. PCT/EP2019/071226, dated Oct. 21, 2019.

First Office Action as issued in Chinese Patent Application No. 201980052950.X, dated Jun. 21, 2021.

* cited by examiner

RADIO-FREQUENCY ENERGY HARVESTING CIRCUIT AND COMMUNICATION DEVICE INTEGRATING SUCH A RADIO-FREQUENCY ENERGY HARVESTING CIRCUIT

CROSS-REFERENCE TO RELATED APPLICATIONS

This application is the U.S. National Stage of PCT/EP2019/071226, filed Aug. 7, 2019, which in turn claims priority to French patent application number 1857445 filed Aug. 10, 2018. The content of these applications are incorporated herein by reference in their entireties.

TECHNICAL FIELD

The present invention belongs to the field of energy harvesting electrical circuits, and more specifically relates to a radio-frequency energy harvesting circuit for harvesting radio-frequency energy at low receiving levels.

PRIOR ART

Figure 1:
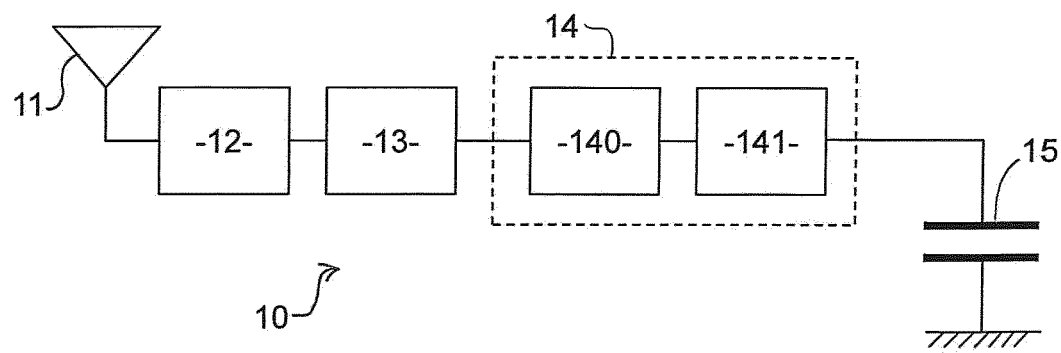

FIG. 1 shows schematically a known example of radio-frequency energy harvesting circuit 10.

As illustrated in FIG. 1, the radio-frequency energy harvesting circuit 10 according to the prior art includes first of all an antenna 11 suitable for receiving the radio-frequency energy.

The radio-frequency energy harvesting circuit 10 also includes a converter suitable for converting the radio-frequency energy received into a direct current electrical voltage, said "RF/DC converter" 13. Generally, the RF/DC converter 13 is a voltage multiplier rectifier circuit composed of one or more diodes and one or more capacitors mutually connected, for example in the form of a Greinacher circuit.

The radio-frequency energy harvesting circuit 10 also includes an impedance matching circuit 12, between the antenna 11 and the RF/DC converter 13, aiming to match the respective impedances of said antenna 11 and of said RF/DC converter 13.

The assembly composed of the antenna 11, the impedance matching circuit 12 and the RF/DC converter 13 is also known under the name of rectifying antenna (or "rectenna") in scientific literature.

The radio-frequency energy harvesting circuit 10 also includes an interface circuit 14 that produces the interface between the RF/DC converter 13 and an electrical energy storage capacity 15. It is subsequently from the storage capacity 15 that other equipment (sensor, microprocessor, wireless communication circuit, etc.) are supplied with electrical energy.

Conventionally, the interface circuit 14 aims to maximise the electrical power supplied to the storage capacity 15. To this end, the interface circuit 14 includes a maximum power point tracking circuit, said "MPPT circuit" 140. In a known manner, a MPPT circuit 140 dynamically modifies the load output from the RF/DC converter 13 in order to maximise the electrical power output from said MPPT circuit 140. Most often, the MPPT circuit 140 is also monitored by a direct current boost circuit, said "DC/DC boost converter" 141, which aims to increase the maximum voltage value at the terminals of the storage capacity 15.

A radio-frequency energy harvesting circuit 10 as illustrated in FIG. 1 has good performances when the radio-frequency energy received by the antenna 11 is not too low, greater than −17 dBm. For such radio-frequency energy levels received, the interface circuit 14 indeed makes it possible to maximise the electrical power supplied to the storage capacity 15, and therefore to charge same effectively and rapidly.

However, such a radio-frequency energy harvesting circuit 10 is not suitable in the case where the radio-frequency energy received by the antenna 11 is lower. For example, a radio-frequency energy level received lower than −20 dBm will generally be insufficient to supply alone the MPPT circuit 140, which includes numerous active components that must be supplied with electrical energy in order to be able to operate. The electrical energy supplied by the RF/DC converter 13 being insufficient to operate the MPPT circuit 140, and more generally the interface circuit 14, it is then not possible to charge the storage capacity 15.

For example, in a wireless power supply system wherein the radio-frequency energy harvesting circuit 10 is supplied remotely by a radio-frequency energy transmitter, then the minimum level of electrical energy received for charging the storage capacity 15 determines the maximum range of said wireless power supply system. A level of reception of −17 dBm corresponds, for a radio-frequency energy transmitter that transmits at 33 dBm (2 Watts), to a maximum range of 10 metres. Yet, it is desired, for some applications, to be able to reach a maximum range greater than 20 or 30 metres, which is not possible with a radio-frequency energy harvesting circuit 10 as illustrated in FIG. 1.

DESCRIPTION OF THE INVENTION

The aim of the present invention is to remedy all or part of the limitations of the solutions of prior art, notably same described above, by proposing a solution that enables the radio-frequency energy to be harvested at lower reception levels than same of the prior art.

To this end, and according to a first aspect, the invention relates to a radio-frequency energy harvesting circuit, including an antenna suitable for receiving the radio-frequency energy, a converter suitable for converting the radio-frequency energy received into a direct current electrical voltage, said "RF/DC converter", an electrical energy storage capacity and an interface circuit arranged between an output port of said RF/DC converter and said electrical energy storage capacity. Said interface circuit is a passive electrical circuit including a resistive load placed in series between the output port of the RF/DC converter and the electrical energy storage capacity, so that the RF/DC converter charges the electrical energy storage capacity through said resistive load, said resistive load being of static value equal to or greater than 400 kilo-ohms.

Thus, as opposed to the interface circuit 14 according to the prior art described above, including a MPPT circuit 140 that includes numerous active components having to be supplied, the interface circuit according to the invention is a passive electrical circuit, that is to say composed only of passive components. Consequently, it is possible to charge the storage capacity even with the low radio-frequency energy levels received.

In particular, the interface circuit according to the invention includes, and is preferably composed of, a resistive load arranged in series between the output port of the RF/DC converter and the electrical energy storage capacity. Furthermore, said resistive load is of high value, that is to say greater than 400 kilo-ohms (400 kΩ). The value of said resistive load is static, that is to say that same cannot be modified and is therefore the same regardless of the radio-frequency energy level received. Such a resistive load of high value, in series between the RF/DC converter and the storage capacity, introduces losses by Joule effect that are all the more important as the value of said resistive load is high. In principle, such losses by Joule effect would need to be avoided since the electrical energy consumed by said resistive load is not transmitted to the storage capacity. However, the inventors noted that the presence of such a resistive load would make it possible to improve the sensitivity of the radio-frequency energy harvesting circuit, so that the storage capacity 15 may be charged even with the low radio-frequency energy levels received. The higher the value of said resistive load, theoretically the higher the sensitivity is of the radio-frequency energy harvesting circuit. In preferred embodiments, the value of said resistive load may be greater than 1 mega-ohms (1 MΩ), or even greater than 3 or 6 MO.

However, it goes without saying that, in relation to the prior art, the electrical power transmitted to the storage capacity is not maximised.

For example, with a radio-frequency energy level received greater than −17 dBm, the radio-frequency energy harvesting circuit 10 of the prior art makes it possible to charge the storage capacity 15 more rapidly. Therefore, the radio-frequency energy harvesting circuit according to the invention does not make it possible to have a charge as rapid as same of the prior art, but makes it possible, however, to charge the storage capacity with the radio-frequency energy levels received for which no load is possible with the radio-frequency energy harvesting circuit according to the prior art.

Another advantage of the resistive load arranged in series between the output port of the RF/DC converter and the storage capacity lies in the fact that same makes it possible to protect the radio-frequency energy harvesting circuit against a possible overcurrent, since the high value of said resistive load will limit the maximum intensity of the current circulating in the radio-frequency energy harvesting circuit. Thus, said resistive load makes it possible both to improve the sensitivity of the radio-frequency energy harvesting circuit and to limit the intensity of the current circulating therein.

In specific embodiments, the radio-frequency energy harvesting circuit may further include one or more of the following features, taken alone or according to any possible technical combinations.

In specific embodiments, the electrical energy storage capacity includes a super-capacitor.

In specific embodiments, the RF/DC converter is a Greinacher circuit. According to a second aspect, the invention relates to a communication device, including:
  a communication circuit,
  a radio-frequency energy harvesting circuit according to any one of the embodiments of the invention,
  an electrical voltage control circuit, configured to evaluate a sufficient electrical voltage criterion and, when the sufficient electrical voltage criterion is verified, to supply with electrical energy the communication circuit from the electrical energy storage capacity.

In specific embodiments, the communication device may further include one or more of the following features, taken alone or according to any possible technical combinations.

In specific embodiments, the electrical voltage control circuit includes a direct current boost circuit, said "DC/DC boost converter".

In specific embodiments, the communication circuit includes a control module and a wireless communication module suitable for transmitting messages in the form of radio-frequency signals.

In specific embodiments, the wireless communication module is configured to transmit each message in the form of a sequence of ultra wide band radio pulses.

In specific embodiments, the control module is configured, when same is supplied with electrical energy, to:
  transmit a first message by means of the wireless communication module,
  select a random transmission delay and transmit a second message by means of the wireless communication module, after expiry of the random transmission delay selected.

Such provisions make it possible to reduce the probability of collision between messages transmitted by the different communication devices, in particular for the communication devices incited to transmit simultaneously, such as the communication devices that pass together through a portal structure equipped with a radio-frequency energy transmitter. In such a case, the radio-frequency energy transmitter charges rapidly said communication devices, which tends to group over time the transmissions of the first messages by said communication devices, so that the probability of collision between the first messages is potentially high. The random transmission delay is selected to randomly spread out over time the transmissions of the second messages, making it possible to reduce the probability of collision between the second messages.

PRESENTATION OF FIGURES

Figure 2:
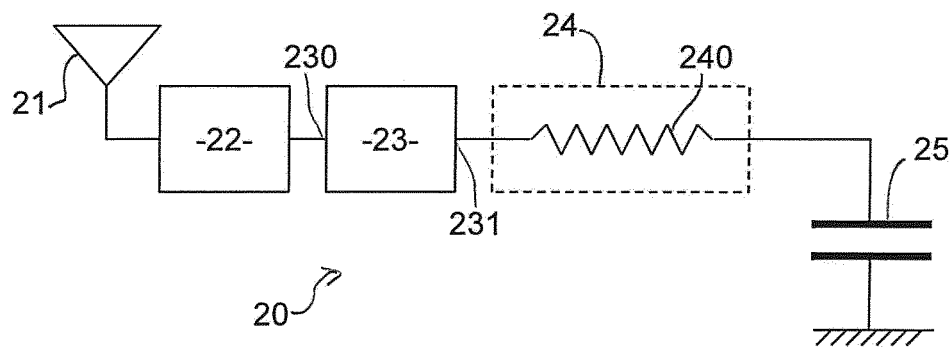
Figure 3:
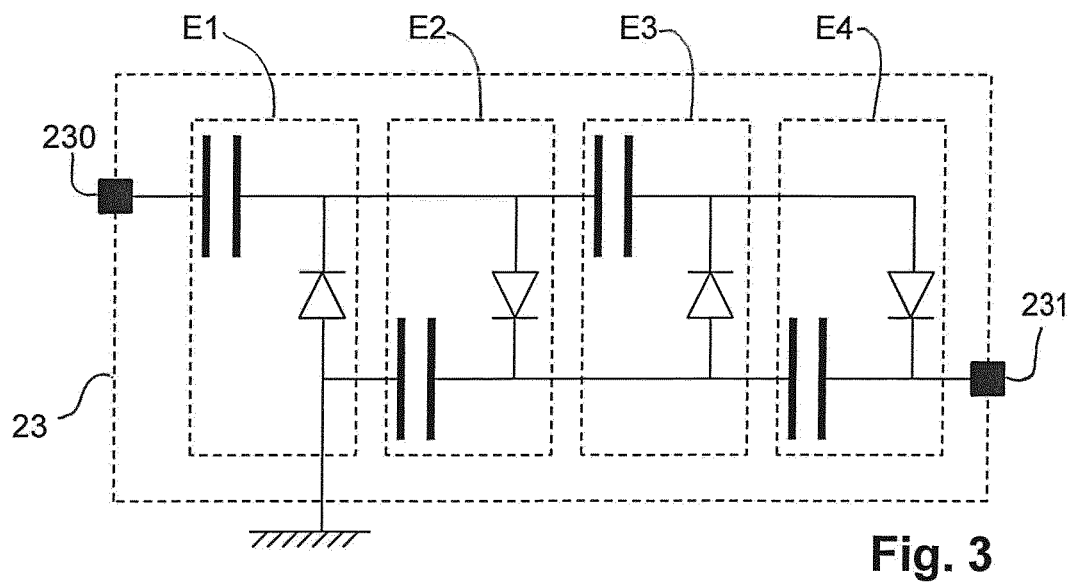
Figure 4:
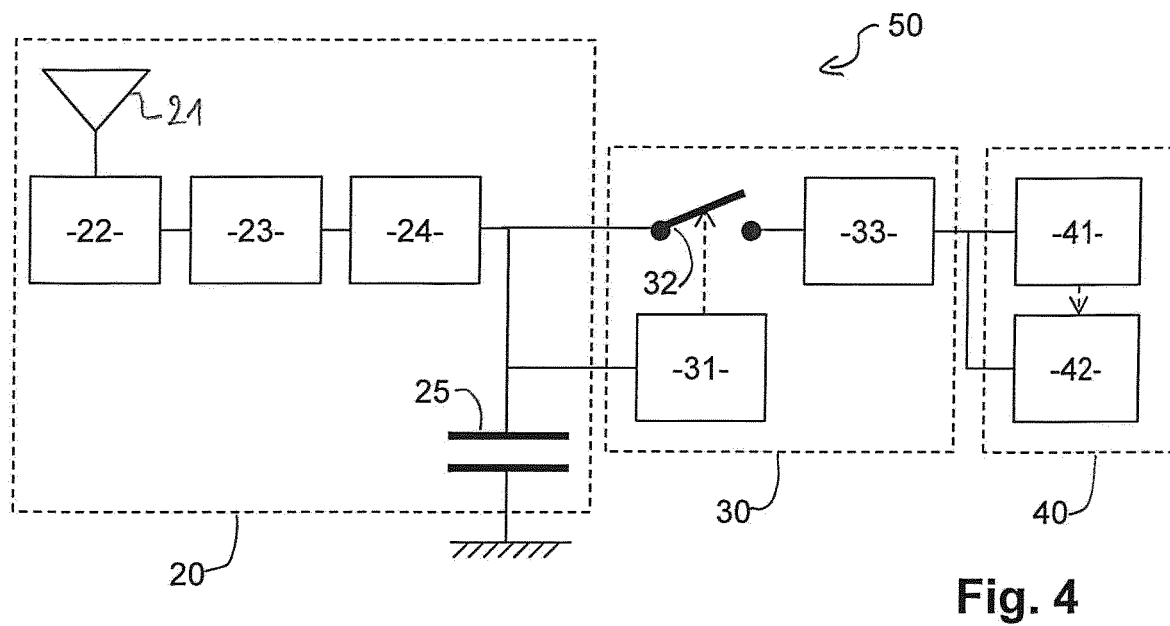
Figure 5:
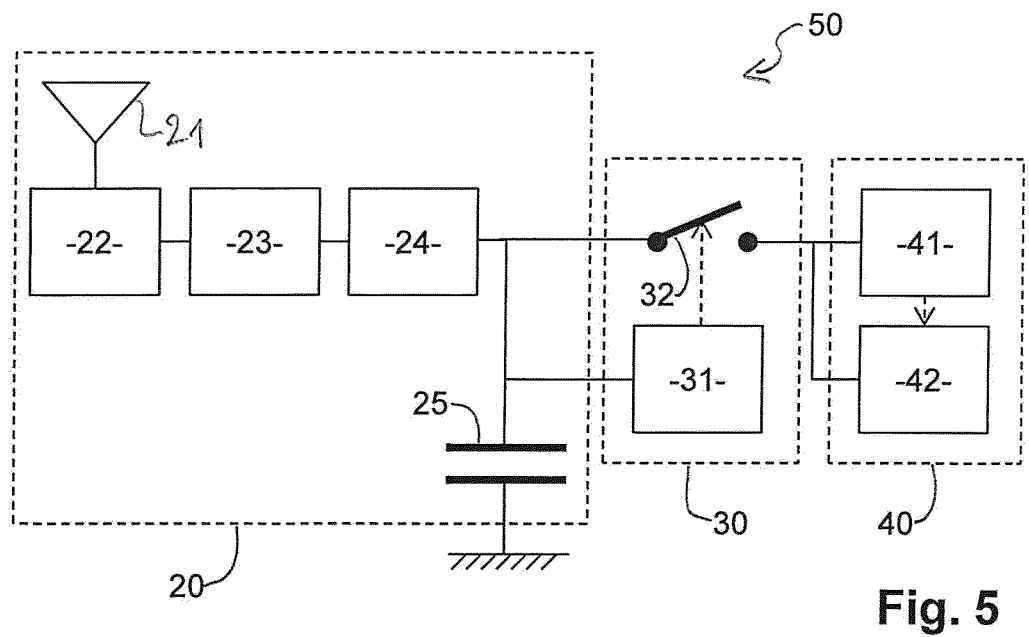

The invention will be better understood upon reading the following description, given by way of non-limiting example, and made in reference to the figures that show:

FIG. 1: already described, a schematic representation of a radio-frequency energy harvesting circuit according to the prior art, FIG. 2: a schematic representation of one embodiment of a radio-frequency energy harvesting circuit according to the invention, FIG. 3: a schematic representation of one embodiment of a RF/DC converter, FIG. 4: a schematic representation of one embodiment of a communication device including a radio-frequency energy harvesting circuit according to the invention, FIG. 5: a schematic representation of one alternative embodiment of the communication device of FIG. 4.

In said figures, identical references from one figure to another designate identical or similar elements. For reasons of clarity, the elements shown are not to scale, unless otherwise specified.

DETAILED DESCRIPTION OF EMBODIMENTS

FIG. 2 shows schematically one example of embodiment of a radio-frequency energy harvesting circuit 20 according to the invention.

As illustrated in FIG. 2, the radio-frequency energy harvesting circuit 20 includes first of all an antenna 21 suitable for receiving the radio-frequency energy within a predetermined frequency band, for example a frequency band centred on 867 megahertz (MHz) or on 915 MHz. However, nothing excludes considering frequency bands centred on other frequencies.

The radio-frequency energy harvesting circuit 20 also includes a converter suitable for converting the radio-frequency energy received by the antenna 21 into a direct current electrical voltage, said "RF/DC converter" 23. More specifically, the radio-frequency energy is received on an input port 230 of the RF/DC converter 23, in the form of an alternating current electrical voltage. The direct current electrical voltage obtained by conversion of the radio-frequency energy is supplied on an output port 231 of the RF/DC converter.

The radio-frequency energy harvesting circuit 20 also includes an impedance matching circuit 22, between the antenna 21 and the input port 230 of said RF/DC converter 23, aiming to match the respective impedances of said antenna 21 and of said RF/DC converter 23 within the predetermined frequency band. In general, the impedance matching circuit 22 departs from the scope of the present invention, and the design of such an impedance matching circuit 22 is considered as being within the reach of the person skilled in the art.

The radio-frequency energy harvesting circuit 20 also includes an interface circuit 24 that produces the interface between the output port 231 of the RF/DC converter 23 and an electrical energy storage capacity 25. It is subsequently from the storage capacity 25 that other equipment (sensor, microprocessor, wireless communication circuit, etc.) are supplied with electrical energy. The storage capacity 25 is for example formed of one or more capacitors, or of one or more super-capacitors, etc. The value of the storage capacity 25 is for example between 10 microfarads (μF) and 220 μF.

According to the invention, the interface circuit 24 is a passive electrical circuit. By "passive electrical circuit", it is understood that said interface circuit 24 only includes passive components (coil, capacitor or resistance). The interface circuit 24 includes at least one resistive load 240 arranged in series between the output port 231 of the RF/DC converter 23 and the electrical energy storage capacity 25, so that the RF/DC converter 23 charges the storage capacity 25 through the resistive load 240. The resistive load 240 includes a first terminal and a second terminal. The first terminal of the resistive load 240 is connected to the output port 231 of the RF/DC converter 23 and the second terminal of the resistive load 240 is connected to a first electrode of the storage capacity 25. The electrical energy storage capacity 25 also includes a second electrode that is connected to the electrical earth.

By "resistive load", it is understood a single resistance (discrete component) between the first terminal and the second terminal, or the equivalent resistance of a group of resistances (discrete components) mutually in series and/or mutually parallel between the first terminal and the second terminal. Preferably, and as illustrated in FIG. 2, the resistive load 240 is composed of a single resistance. The resistive load 240 further is of high value, that is to say equal to or greater than 400 kΩ.

The value of the resistive load 240 is static, that is to say same cannot be controlled or modified over time, and is consequently entirely determined and frozen by the choice of the discrete component or components (resistances) forming said resistive load 240.

The absence of active components having to be supplied in order to be able to operate (and therefore the absence of MPPT circuit) between the RF/DC converter 23 and the storage capacity 25, coupled with the high value of the resistive load 240 in series between the RF/DC converter 23 and the storage capacity 25, makes it possible to improve the sensitivity of the radio-frequency harvesting circuit 20 in relation to the radio-frequency energy harvesting circuit 10 of the prior art described with reference to FIG. 1.

Furthermore, the sensitivity of the radio-frequency energy harvesting circuit 20 increases with the value of the resistive load 240. The value of the resistive load 240 may be, in preferred embodiments, equal to or greater than 1 MΩ, or even equal to or greater than 3 or 6 MΩ, in order to increase the sensitivity of said radio-frequency energy harvesting circuit 20. It should also be noted that the presence of such a resistive load 240 of high value makes it possible to simplify the design of the matching circuit 22.

Preferably, and as illustrated in FIG. 2, the interface circuit 24 is composed of the resistive load 240, that is to say that same does not include any component other than said resistive load 240 between the RF/DC converter 23 and the electrical energy storage capacity 25. However, nothing excludes, according to other examples, having an interface circuit 24 including other passive components, for example in order to produce a passive filter.

The RF/DC converter 23 is for example a voltage multiplier rectifier circuit composed of one or more diodes and one or more capacitors mutually connected.

FIG. 3 shows schematically a non-limiting example of embodiment of the RF/DC converter 23, wherein said RF/DC converter 23 is a Greinacher circuit. In a manner known by the person skilled in the art, such a Greinacher circuit includes at least two stages, each stage including a capacitor and a diode, preferably a Schottky diode. In the non-limiting example illustrated in FIG. 3, the Greinacher circuit includes stages E1, E2, E3 and E4, which makes it possible to obtain theoretically a direct current voltage on the output port 231 that may go up to four times the amplitude of the alternating current voltage received on the input port 230. However, nothing excludes, according to other examples, considering a Greinacher circuit including a number of stages different from four. Typically, the number of stages is chosen based on the electrical voltage desired at the terminals of the storage capacity 25 in order to be able to supply other equipment, taking into account the presence of the resistive load 240 between the RF/DC converter 23 and the storage capacity 25.

In practice, the resistive load 240 of high value makes it possible to improve the sensitivity of the radio-frequency energy harvesting circuit 20 due to the fact that the intensity of the current circulating in the rectifying antenna (antenna 21, matching circuit 22 and RF/DC 23 converter) is low due to the high value of said resistive load 240, which makes it possible to limit the losses of voltage induced by the parasitic resistances (series resistances) of the diodes of the RF/DC converter 23. For the same alternating current electrical voltage on the input port 230, the lower the intensity of the current, the higher the direct current electrical voltage is on the output port 231. In other words, the effectiveness of the RF/DC converter 23 is improved by reducing the intensity of the current. Furthermore, this makes it possible to increase the number of stages of said RF/DC converter 23 without excessively increasing said losses of voltage.

As indicated above, the electrical energy stored in the storage capacity 25 is subsequently used to supply other equipment.

In the remainder of the description, we are placed in a non-limiting way in the case where the radio-frequency energy harvesting circuit 20 is implemented in an communication device 50, that is to say in an item of equipment that uses the electrical energy stored in the storage capacity 25 in order to transmit messages intended for one or more receiving devices, each of said receiving devices may further be a radio-frequency energy transmitter implemented to remotely supply the communication device 50.

FIG. 4 shows schematically one example of embodiment of a communication device 50.

As illustrated in FIG. 4, the communication device 50 includes, in addition to a radio-frequency energy harvesting circuit 20 according to the invention:
- a communication circuit 40,
- an electrical voltage control circuit 30 arranged between the radio-frequency energy harvesting circuit 20 and the communication circuit 40.

In general, the control circuit 30 is configured to ensure that the electrical voltage supplied to the communication circuit 40 is sufficient to enable said communication circuit 40 to operate correctly and therefore to transmit at least one message. Consequently, the control circuit 30 is configured to evaluate a sufficient electrical voltage criterion and, when the sufficient electrical voltage criterion is verified, to supply with electrical energy the communication circuit 40 from the electrical energy storage capacity 25.

In the example illustrated in FIG. 4, the evaluation of the sufficient electrical voltage criterion is mainly performed in two phases. First of all, the control circuit 30 includes a load evaluation module 31 that verifies whether the load of the storage capacity 25 is sufficient, for example by comparing the electrical voltage at the terminals of said storage capacity 25 with a predetermined threshold value. In general, any type of load evaluation module 31 known by the person skilled in the art may be implemented, and the choice of a specific type of load evaluation module constitutes only one alternative implementation of the invention. When the load is considered as sufficient, a switch 32, which was previously in the open state, is ordered by the load evaluation modules 31 to the closed state. In the example illustrated in FIG. 4, the electrical voltage control circuit 30 includes a direct current boost circuit, said "DC/DC boost converter" 33, which is then supplied by the storage capacity 25. The sufficient electrical voltage criterion is then only fully verified when the elevated electrical voltage supplied by the DC/DC boost converter 33 has reached an electrical voltage sufficient to supply the communication circuit 40. When such is the case, the elevated electrical voltage is supplied to the communication circuit 40 that can then be activated in order to, in particular, transmit a message.

It should be noted that the presence of the DC/DC boost converter 33 is necessary only if the electrical voltage supplied by the storage capacity 25 (and therefore by the RF/DC converter 23) is not sufficient for directly supplying the communication circuit 40.

In the opposite case, the presence of a DC/DC boost converter 33 is not necessary, and FIG. 5 shows schematically an example of embodiment wherein the electrical voltage control circuit 30 is void of a DC/DC boost converter 33.

In the examples illustrated in FIGS. 4 and 5, the communication circuit 40 includes a control module 41 and a wireless communication module 42.

The wireless communication module 42 is presented for example in the form of a radio-frequency circuit including equipment (antenna, amplifier, local oscillator, mixer, analogue filter, etc.) suitable for transmitting messages in the form of radio-frequency signals considered as known by the person skilled in the art.

For example, the wireless communication module 42 is configured to transmit each message in the form of a sequence of ultra wide band radio pulses. By "ultra wide band" or "UWB", it is understood that the message, transmitted in the form of a radio-frequency signal, has at a given moment an instantaneous frequency spectrum of width (at −10 dB in relation to the maximum power of said instantaneous frequency spectrum) greater than 500 MHz. For example, said messages are transmitted within a frequency band centred on 4 gigahertz (GHz) and/or centred on 7.25 GHz. However, nothing excludes considering frequency bands centred on other frequencies.

The control module 41 includes for example one or more processors and storage means (magnetic hard drive, electronic memory, optical disk, etc.) wherein is stored a computer program product, in the form of a set of program code instructions to be executed in order to control the operation of the wireless communication module 42. Alternatively or in addition, the control module 41 includes one or more programmable logic circuits (FPGA, PLD, etc.), and/or one or more specialised integrated circuits (ASIC), and/or a set of discrete electronic components, etc., suitable for controlling the operation of the wireless communication module 42.

In other words, the control module 41 includes a set of means configured by software (specific computer program product) and/or hardware (FPGA, PLD, ASIC, discrete electronic components, etc.) to control the wireless communication module 42.

In preferred embodiments, the control module 41 is configured, when same is supplied with electrical energy, to:
- transmit a first message by means of the wireless communication module 42,
- select a random transmission delay and transmit a second message by means of the wireless communication module 42, after expiry of the random transmission delay selected.

Such provisions make it possible to reduce the probability of collision for some messages. The random transmission delay is for example selected randomly within a predetermined range of possible delays, delimited by a minimum delay value that may be positive or zero and a maximum delay value that may be greater than the duration of one or more messages. In general, any known method for selecting random values may be implemented, and the choice of one specific method constitutes only one alternative implementation of the invention. The random value selection method retained must make it possible to ensure that, at the same given moment, the probability that two different communication devices 50 simultaneously select the same random transmission delay is low. Once the random transmission delay has been selected, the control module 41 and the wireless communication module 42 wait before transmitting the second message, throughout the entire duration of said random transmission delay selected. The second message is transmitted by the wireless communication module 42 only on expiry of said random transmission delay selected.

The invention claimed is:

1. A radio-frequency energy harvesting circuit including an antenna arranged to receive radio-frequency energy, an RF/DC converter arranged to convert the radio-frequency energy received into a direct current electrical voltage, an electrical energy storage capacity and an interface circuit arranged between an output power of said RF/DC converter and said electrical energy storage capacity, wherein the interface circuit is a passive electrical circuit including a resistive load placed in series between the output port of the RF/DC converter and the electrical energy storage capacity, so that the RF/DC converter charges the electrical energy storage capacity through said resistive load, said resistive load being of static value equal to or greater than 400 kilo-ohms.

2. The radio-frequency energy harvesting circuit according to claim 1, wherein the resistive load is of value equal to or greater than 1 mega-ohms.

3. The radio-frequency energy harvesting circuit according to claim 2, wherein the resistive load is of value equal to or greater than 3 mega-ohms.

4. The radio-frequency energy harvesting circuit according to claim 1, wherein the electrical energy storage capacity includes a super-capacitor.

5. The radio-frequency energy harvesting circuit according to claim 1, wherein the RF/DC converter is a Greinacher circuit.

6. A communication device, including a communication circuit, comprising:
 a radio-frequency energy harvesting circuit according to claim 1,
 an electrical voltage control circuit, configured to evaluate a sufficient electrical voltage criterion and, when the sufficient electrical voltage criterion is verified, to supply the communication circuit with electrical energy from the electrical energy storage capacity.

7. The communication device according to claim 6, wherein the electrical voltage control circuit includes a direct current DC/DC boost converter.

8. The communication device according to claim 6, wherein the communication circuit includes a control module and a wireless communication module arranged to transmit messages in the form of radio-frequency signals.

9. The communication device according to claim 8, wherein the wireless communication module is configured to transmit each message in the form of a sequence of ultra wide band radio pulses.

10. The communication device according to claim 8, wherein the control module is configured, when supplied with the electrical energy, to:
 transmit a first message by the wireless communication module,
 select a random transmission delay and transmit a second message by the wireless communication module, after expiry of the random transmission delay selected.

* * * * *